April 24, 1934.  F. D. FUNSTON  1,956,383
SHOCK ABSORBER
Filed March 14, 1932
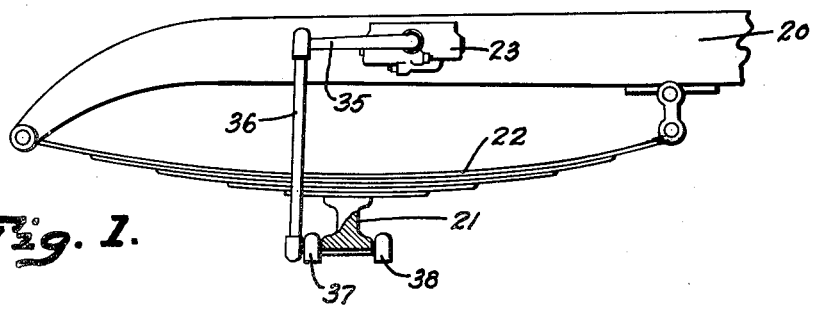
Fig. 1.
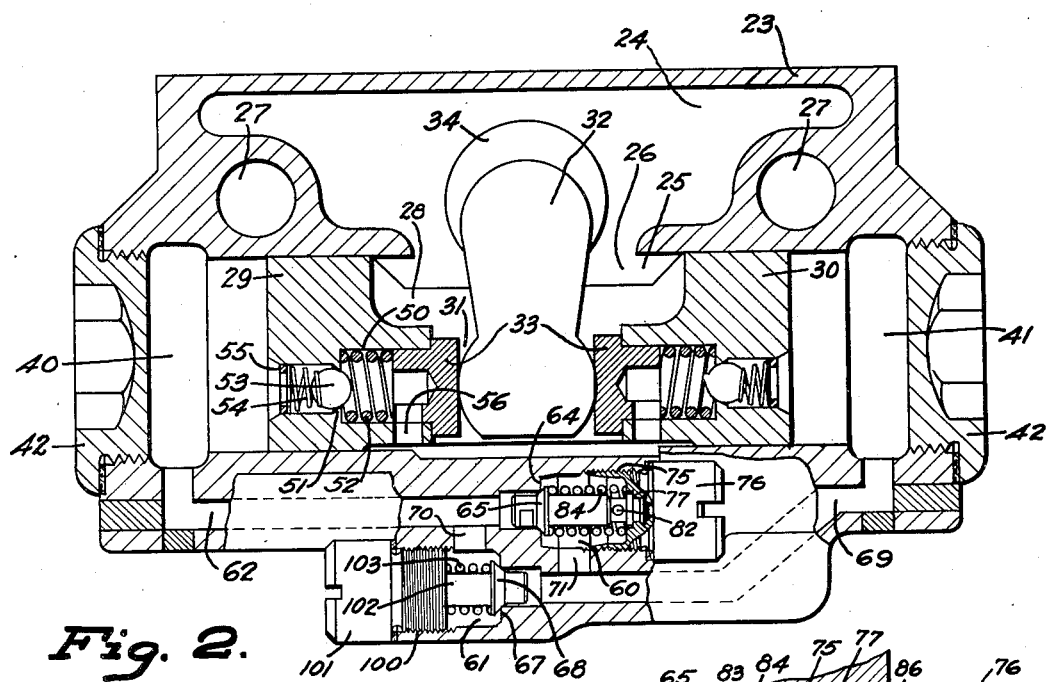
Fig. 2.
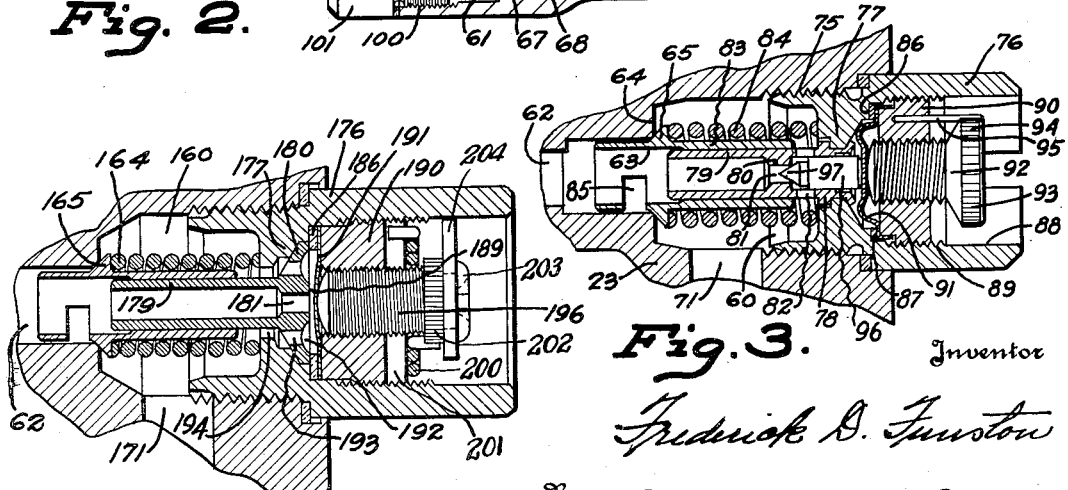
Fig. 3.
Fig. 4.
Inventor
Frederick D. Funston
By Spencer, Hardman and Fehr
Attorneys Patented Apr. 24, 1934

1,956,383

UNITED STATES PATENT OFFICE 1,956,383

SHOCK ABSORBER

Frederick D. Funston, Dayton, Ohio, assignor, by mesne assignments, to General Motors Corporation, Detroit, Mich., a corporation of Delaware Application March 14, 1932, Serial No. 598,697

5 Claims. (Cl. 188—88)

This invention relates to improvements in hydraulic shock absorbers.

It is among the objects of the present invention to provide a hydraulic shock absorber having fluid flow control devices therein with means accessible from outside the shock absorber for adjusting said fluid flow control devices.

Another object of the present invention is to provide a means for sealing passages of the shock absorber against fluid leaks, said means being movable by an exterior element for adjusting an interior fluid flow control device.

Further objects and advantages of the present invention will be apparent from the following description, reference being had to the accompanying drawing, wherein a preferred embodiment of one form of the present invention is clearly shown.

In the drawing:

Fig. 1 is a fragmentary side view of a vehicle chassis having a shock absorber applied thereto which is equipped with the present invention.

Fig. 2 is a longitudinal sectional view taken through the shock absorber showing its operating parts.

Fig. 3 is an enlarged fragmentary sectional view showing a fluid flow control device of the shock absorber.

Fig. 4 is a view similar to Fig. 3 showing a modified form of fluid flow control device.

Referring to the drawing, the numeral 20 designates the frame of the vehicle which is supported upon the vehicle axle 21 by springs 22. The wheels of the vehicle (not shown in the present drawing) are supported upon the axle.

The shock absorber comprises a casing 23 providing a fluid reservoir 24 and a cylinder 25, these two being in communication through the aperture 26. Holes 27 are provided in the shock absorber casing for receiving bolts by means of which the shock absorber is attached to the frame 20 of the vehicle.

A piston 28 is slidably supported within the cylinder 25, this piston comprising piston head portions 29 and 30. A space 31 is provided between the piston head portions 29 and 30 inside the piston 28, said space receiving the free end of the rocker lever 32. As shown in Fig. 2, this rocker lever engages wear blocks 33 mounted on the inner surface of each piston head portion 29 and 30. The rocker lever or arm 32 is attached to or formed integral with the rocker shaft 34 which is journalled in the casing 23 of the shock absorber, one end thereof extending outside of the casing and having the shock absorber operating arm 35 attached thereto. The free end of this arm is swivelly secured to one end of a link member 36, the opposite end of which is swivelly anchored to a member 37 clamped to the axle by any suitable means as designated by the numeral 38.

The piston head portion 29 forms what may be termed the vehicle spring compression control chamber 40 at one end of the cylinder 25, while piston head portion 30 forms what may be termed the vehicle spring rebound control chamber 41 at the opposite end of the cylinder 25. Both ends of the cylinder in this instance are closed by cylinder head caps 42 properly gasketed to prevent fluid leaks.

Each piston head is provided with a suitable check valve permitting fluid to flow from the reservoir 24 into the respective compression chambers as the piston moves to increase the cubical contents of the respective compression chambers. Inasmuch as both valves are alike, only one will be described detailedly.

Each piston head has a through passage 50 in which an interior annular flange provides a valve seat 51. This flange presents a shoulder against which one end of a spring 52 abuts, the other end of said spring engaging the wear block 33 to urge it toward the rocker arm 32 to maintain engagement therewith. A ball check valve 53 is yieldably urged upon the valve seat 51 by a spring 54 abutting against an abutment ring 55, secured in the passage of the piston head in any suitable manner. The chamber in which spring 52 is provided is in communication with the reservoir 24 through passages 56 formed by aligned holes in the side wall of the wear block 33 and in the piston head portion 29.

It may be seen that as the piston moves toward the right as regards Fig. 2, fluid from the reservoir may flow through passages 56 into the chamber containing spring 52, forcing the ball check valve 53 from its seat against the effect of spring 54 to establish a flow into the spring compression control chamber 40. The intake valve mechanism in the piston head portion 30 operates to establish a flow from the reservoir 24 into the spring rebound control chamber 41 in response to movement of the piston 28 toward the left as regards Fig. 2, or more specifically on the spring compression control stroke of the shock absorber.

In the casing are provided two valve chambers 60 and 61, the outer ends of which open to the outside of the shock absorber casing. A duct 62 leads from the spring compression control chamber 40 into the valve chamber 60. The valve chamber 60 has a shoulder 64, providing a seat for the valve 63. The valve chamber 61 has a shoulder 67, forming a valve seat for the valve 68. This valve chamber 61 has a duct 69 opening thereinto, this duct leading into the spring rebound control chamber 41. Duct 62 communicates with valve chamber 61 through a cross passage 70, a similar cross passage 71 providing communication between the duct 69 and the valve chamber 60. In both instances cross passages 70 and 71 communicate with their respective valve chambers between the valve seat and the outer open end of the valve chamber, or more specifically on the relief side of the valve seat.

The fluid flow control device in the spring compression control chamber 40 and its duct 62 will now be described.

Referring particularly to Fig. 3, it will be seen that the outer end of the recess or valve chamber 60 is interiorly threaded as at 75 for receiving the threaded end of a screw plug 76. This screw plug 76 is hollow, having an inwardly extending, annular flange 77 in which is secured the end 78 of the tubular member 79 of the fluid flow control device. This tubular member 79 of the fluid flow control device has an inwardly extending, annular flange 80 providing a restricted throat portion 81 therein. Between this restricted throat portion 81 and the end of the tubular member attached to the screw cap 76 are a plurality of side openings 82 providing communication between the interior of the tubular member 79 and the chamber provided in the valve chamber between the shoulders 64 and the inner surface of the annular flange 77 of screw plug 76. The tubular member 79 of the fluid flow control device slidably supports a fluid pressure release valve 63 including the tubular body portion 83 and the outwardly extending, annular flange 65 which is the portion of the valve engaging the valve seat 64. A spring 84 interposed between the valve flange 65 and the screw plug 77 yieldably urges the valve flange 65 against its seat. The tubular portion of the valve inside the port or chamber 63 has an opening 85 in its side wall providing for the flow of fluid therethrough when the flange 65 is moved from its seat in response to fluid pressure.

A shoulder 86 is provided by the annular flange 77 in the screw cap, this shoulder having a packing gasket 87 provided thereon. The inner portion 88 of the screw cap 76 is interiorly threaded as at 89 to receive the plug 90, the inner end of which has a reduced diameter portion about which fits an annular flange of the sealing disc 91. By screwing the plug 90 into the screw plug or cap 76 a sufficient distance, the sealing disc 91 will be tightly clamped or pressed against the gasket 87 so that fluid leaks at this point are substantially eliminated. A central opening in the plug 90 is threaded to receive the actuator screw 92, the outer end having a head 93, the inner end engaging the sealing disc 91 as shown in Fig. 3. The peripheral surface of the head 93 is provided with notches 94 engaged by a flexible locking pin 95 carried by the plug 90, this flexible pin maintaining the actuator screw 92 in adjusted position.

Within the end 78 of the tubular member 79 there is slidably supported a metering pin 96, one end of which is engaged by the sealing disc 91, the opposite end being tapered as at 97 and extending into the reduced throat portion 81 to restrict its area.

In the valve chamber 61, which is interiorly threaded as at 100, a screw plug 101 is fitted, said screw plug being recessed to receive the body portion 102 of the pressure release valve 68. This valve is yieldably urged upon its seat to shut off communication between the valve chamber 61 and the duct 69 by a spring 103 interposed between the valve 68 and the screw plug 100. Valve 68 normally completely closes duct 69, but is adapted in response to a predetermined fluid pressure in said duct, to open and establish a flow of fluid therefrom into chamber 61.

These fluid flow control devices act in the following manner:

Supposing the wheels of the vehicle strike an obstruction in the roadway, axle 21 will be urged toward the frame 20, thereby compressing springs 22, moving them toward the frame 20. This movement will cause the link 36 to rotate the shock absorber operating arm 35 clockwise, resulting in a clockwise rotation of the shaft 34 and the rocker lever 32. The piston 28 will be moved toward the left as regards Fig. 2, in response to such movement of the rocker arm 32, and consequently pressure will be exerted upon the fluid within the spring compression control chamber 40, urging the fluid from said chamber through duct 62 against the valve 65. It will be noted that the fluid pressure being exerted through cross passage 70 against the relief side of valve 68 will cause no fluid flow past this valve. The fluid flowing through duct 62 toward and against valve 65 will flow through said valve and the tubular member 79 and its restricted throat portion 81, being restricted by the metering pin 97 in this portion. This restricted flow will continue through cross passages 82 into the valve chamber 60 from whence the fluid will flow through cross passage 71 into the duct 69 and then into the rebound control chamber 41, the area of which is being increased by the movement of the piston 28 toward the left. If, in response to excessive compression movements of the spring 22, the fluid pressure within the compression control chamber 40 cannot properly be relieved by the restricted orifice presented in the restricted throat portion 81 of the tubular valve member 79, then the fluid pressure will move valve 63 from its seat 64, against the effect of the spring 84, to establish another flow from the passage 62 through the side opening 85 of the tubular valve 83 into the valve chamber 60, thence through the cross passage 71 into the duct 69 through the rebound control chamber 41.

The springs having reached their limit of compression due to the obstruction being encountered, will tend to return to normal load position with a rebounding movement, causing a reversal of the piston operating member and also of the piston. Upon the rebounding movement, or more specifically the movement of the piston 28 toward the right, fluid within the chamber 41 will have pressure exerted thereupon, the fluid being urged into the duct 69 against the valve 68 in said duct. The first flow of fluid will, however, be established through the cross passage 71 into the valve chamber 60, thence through the cross passages 82, past the metering pin 97 through the restricted throat portion 81 and thence through the tubular portion 79 and valve 83 into the duct 62 from where it will flow into the chamber 40, which is now being increased in area due to the movement of the piston 28 toward the right. If, as before, the pressure becomes excessive and cannot properly be relieved by the orifice presented between the metering pin 97 and the restricted throat portion 87, then valve 68 is moved from its seat 67 and a flow is established around the valve 68 into the chamber 61 from which it will flow through the cross passage 70, duct 62 into the chamber 40.

It is desirable to provide the shock absorber with means whereby it may be adjusted. For these reasons actuator screw 92 is provided, which, when screwed outwardly, will permit the flexible disc 91 to flex outwardly away from the metering pin 96, thus permitting the metering pin 96 to move outwardly under pressure so that its tapered end 97 will not extend as far into the restricted throat portion 91, thus increasing the orifice and thus reducing the restriction to the fluid flow. On the other hand, when it is desirable to have the shock absorber offer greater resistance to body and spring action, then the actuator 92 is screwed inwardly, flexing the sealing disc 91 to move the metering pin 96 toward the restricted throat portion 81 whereby the orifice therein will be reduced by the tapered end 97 of the metering pin and thus increase the restriction to the fluid flow.

In the Fig. 4 a modified form of fluid flow control device adapted to take the place of the fluid flow control device in Fig. 3 is shown. Here the tubular member 179 is provided with a head portion 180 which is clamped against one side of the interior annular flange 177 of the screw plug 176 by the plug 190 which also clamps the flexible sealing disc 191 and the gasket 186 toward and against the head 180 of the tubular portion of the valve. The restricted throat portion 181 in the tubular member 179 is at the extreme inner end of said member. A space is normally provided between the head 180 of valve member 179 and the sealing disc 191, this space providing the fluid flow control orifice 189. An annular groove 192 in the end surface of the valve head 180 adjacent the disc 191 has passages 193 leading therefrom, said passages communicating with an annular space 194 provided between the flange 177 of the screw plug and the tubular valve member 179. The pressure release valve 165 is similar to the valve 65 of the structure shown in Fig. 3, this valve 165 being urged upon its seat by the spring 164. The actuator screw 196 is substantially like the actuator screw 92, the inner end of said actuator screw engaging the flexible disc 191 to adjust it in accordance with the outer end of the tubular valve member 179 to vary the size of the orifice 189.

It will be seen that fluid flow from the duct 62 through the valve 165 and tubular member 179 will be restricted by the orifice 189 presented between the end of the tubular member 179 and the flexible sealing disc 191, thence flowing into the annular groove 192, then through the passages 193 and space 194 into the valve chamber 160 from whence the fluid will flow through the cross passage 171, through duct 69 into the rebound control chamber 41. Excessive pressures will move valve 165 in a similar manner as has been described in connection with Fig. 3.

Operation of the screw 196 inwardly or outwardly will respectively flex the disc 191 toward or away from the end of the tubular member 179 and thus decrease or increase the size of the orifice 189, thereby increasing or decreasing respectively the fluid flow established thereby.

A coil spring 200 has its one end extending into a transverse slot 201 in the end of plug 190, the other end being angularly formed to engage notches 202 in the peripheral surface of the head 203 of screw 196. This spring maintains said screw in any one of the numerous positions into which it may be adjusted. On the head 203 a pointer element 204 is provided which clearly shows how far from one position said screw has been adjusted.

While the form of embodiment of the present invention as herein disclosed, constitutes a preferred form, it is to be understood that other forms might be adopted, all coming within the scope of the claims which follow.

What is claimed is as follows:

1. In a shock absorber having a casing providing a cylinder in which a piston forms a compression chamber into and out of which fluid is forced through a port, a fluid flow control device for said port comprising, a stationary tubular member; a valve slidably fitting about said tubular member and yieldably urged into the port to prevent fluid flow from the port around the tubular member; a plunger valve slidably carried within the tubular member to restrict the fluid flow therethrough; a resilient member for sealing the device to prevent fluid leaks, said resilient member being engaged by the plunger valve; and means carried by the valve so as to engage the resilient member and adapted to be operated to flex the said member for adjusting the plunger valve to vary its restriction to the fluid flow through the tubular member.

2. In a shock absorber having a casing providing a cylinder in which a piston forms a compression chamber into and out of which fluid is forced through a port, a fluid flow control device for said port comprising, a hollow plug secured in the casing; a tubular member carried by the hollow plug; a tubular valve fitting about the tubular member and having a flange closing the port to prevent fluid flow around the tubular member; a plunger valve within the tubular member providing a constant restriction to the flow of fluid therethrough; a diaphragm attached to the hollow plug so as to be engageable by the plunger valve, said diaphragm providing a seal to prevent leaks from the control device; and a member adjustably carried by the hollow plug, engaging the diaphragm and adapted to be operated to flex the diaphragm for moving the plunger valve to change its restriction to fluid flow.

3. In a shock absorber having a casing providing a cylinder in which a piston forms a compression chamber into and out of which fluid is forced through a port, a fluid flow control device for said port comprising, a hollow plug secured in the casing coaxially of the port; a tubular member carried by said plug, said tubular member having a restricted throat portion; a sleeve valve slidably fitting over the tubular member; a spring interposed between the plug and sleeve valve, yieldably urging the said valve to enter the port and prevent fluid flow therefrom and around the tubular member; a plunger valve within the tubular member, having a tapered end adapted to extend into the restricted throat portion of said member to throttle the fluid flow therethrough; a diaphragm in the plug, sealing it against leaks from the control device, said diaphragm acting as a locater for the plunger valve; and an adjustable member carried by the plug and engaging the diaphragm for flexing it to adjust the plunger valve.

4. In an hydraulic shock absorber in which a fluid is forced through a port, a fluid flow control device for said port comprising, a stationary tubular member; a valve slidably fitting over said tubular member and yieldably urged into the port to prevent fluid from flowing out of said port around said tubular member; and means for restricting the flow of fluid through said tubular member, said means including a flexible diaphragm engaged by an adjustable screw adapted to be operated to flex said diaphragm toward or away from said tubular member.

5. In an hydraulic shock absorber in which a fluid is forced through a port, a fluid flow control device for said port comprising, a stationary tubular member having a restricted throat portion adjacent its one end; a sleeve valve fitting about the tubular member; a spring urging said sleeve valve into the duct to prevent a fluid flow therefrom around the tubular member, and means including a diaphragm adjacent the end of the tubular member having the restricted throat portion and an adjustable screw engaging said diaphragm, adapted to be operated to flex said diaphragm more or less to restrict the fluid flow through the restricted throat portion of the tubular member.

FREDERICK D. FUNSTON.